(12) United States Patent
Liu (10) Patent No.: US 11,204,440 B2
(45) Date of Patent: Dec. 21, 2021

(54) SYSTEMS AND METHODS FOR INSECT DETECTION

(71) Applicant: Verily Life Sciences LLC, South San Francisco, CA (US)

(72) Inventor: Jianyi Liu, Santa Clara, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 296 days.

(21) Appl. No.: 16/552,654

(22) Filed: Aug. 27, 2019

(65) Prior Publication Data

US 2020/0081152 A1 Mar. 12, 2020

Related U.S. Application Data

(60) Provisional application No. 62/727,586, filed on Sep. 6, 2018.

(51) Int. Cl.
| | | |
|---|---|---|
| *A01M 1/04* | (2006.01) | |
| *G01V 8/20* | (2006.01) | |
| *G06K 9/00* | (2006.01) | |
| *G06K 9/78* | (2006.01) | |
| *A01M 1/10* | (2006.01) | |

(Continued)

(52) U.S. Cl.
CPC ............... *G01V 8/20* (2013.01); *A01M 1/04* (2013.01); *A01M 1/103* (2013.01); *A01M 1/106* (2013.01); *G06K 9/00362* (2013.01); *G06K 9/6256* (2013.01); *G06K 9/78* (2013.01); *H04N 5/232411* (2018.08)

(58) Field of Classification Search
CPC ...................................................... A01M 1/04
See application file for complete search history.

(56) References Cited

U.S. PATENT DOCUMENTS

| 5,343,652 A | 9/1994 | Johnson | |
|---|---|---|---|
| 10,375,947 B2 * | 8/2019 | Liu | ............... G01S 7/4811 |
| 10,827,738 B2 * | 11/2020 | Kim | ............... A01M 1/10 |

(Continued)

FOREIGN PATENT DOCUMENTS

| JP | 3726206 | 12/2005 |
|---|---|---|
| JP | 2017192321 | 10/2017 |
| KR | 20080109307 | 12/2008 |

OTHER PUBLICATIONS

International Application No. PCT/US2019/048458, International Preliminary Report on Patentability, dated Mar. 18, 2021, 8 pages.

(Continued)

*Primary Examiner* — Olisa Anwah
(74) *Attorney, Agent, or Firm* — Kilpatrick Towsend & Stockton LLP (57) ABSTRACT

One example system for insect detection includes a block of material defining a transit opening and a sensing opening, the transit opening defined along a first axis in a first direction, and the sensing opening defined to provide a light path to traverse a cross-section of the transit opening; a light emitter positioned at a first end of the sensing opening and oriented to project light through the sensing opening and across the transit opening; and a plurality of light detectors positioned at a second end of the sensing opening and oriented to receive the projected light and to output detector signals based on an amount of detected light.

27 Claims, 8 Drawing Sheets

(51) Int. Cl.
*H04N 5/232* (2006.01)
*G06K 9/62* (2006.01)

(56) References Cited

U.S. PATENT DOCUMENTS

| | | |
|---|---|---|
| 2012/0032812 A1 | 2/2012 | Kozawa et al. |
| 2012/0092623 A1 | 4/2012 | Huebner |
| 2016/0245916 A1* | 8/2016 | Weber-Grabau ....... G01B 11/08 |
| 2017/0035039 A1* | 2/2017 | Sandford .............. A01M 1/145 |

OTHER PUBLICATIONS

International Application No. PCT/US2019/048458, International Search Report and Written Opinion, dated Nov. 18, 2019, 9 pages.

* cited by examiner

SYSTEMS AND METHODS FOR INSECT DETECTION

CROSS-REFERENCE TO RELATED APPLICATIONS

This application claims priority to U.S. Patent Application No. 62/727,586, filed Sep. 6, 2018, titled "Systems and Methods for Insect Detection," the entirety of which is hereby incorporated by reference.

FIELD

The present disclosure generally relates to insect breeding or capture, and more specifically relates to systems and methods for insect detection.

BACKGROUND

All continents except Antarctica suffer from the plague of mosquito-vectored diseases. Various techniques for the control of mosquito populations involve the generation of sterile male insects for release into the wild for mating with local females. These techniques require systems for releasing the reared insects into the wild.

SUMMARY

Various examples are described for systems and methods for insect detection. One example system for insect detection includes a block of material defining a transit opening and a sensing opening, the transit opening defined along a first axis in a first direction, and the sensing opening defined to provide a light path to traverse a cross-section of the transit opening; a light emitter positioned at a first end of the sensing opening and oriented to project light through the sensing opening and across the transit opening; and a plurality of light detectors positioned at a second end of the sensing opening and oriented to receive the projected light and to output detector signals based on an amount of detected light.

One example method for insect detection includes emitting light using a light emitter into a block of material defining a transit opening and a sensing opening, the transit opening traversing the block of material in a first direction, and the sensing opening traversing the block of material in a second direction and intersecting the transit opening, the second direction different from the first direction, detecting, using a plurality of light detectors, an amount of light detected by each light detector of the plurality of light detectors; determining a presence of an insect based on the amount of light detected by at least one light detector; and wherein: the light emitter positioned at a first end of the sensing opening and oriented to project light through the sensing opening and across the transit opening, and a plurality of light detectors positioned at a second end of the sensing opening and oriented to receive the projected light and to output detector signals based on an amount of detected light.

One example non-transitory computer-readable medium comprising processor-executable instructions configured to cause a processor to: receive sensor signals from an insect counter, the insect counter comprising: a block of material defining a transit opening and a sensing opening, the transit opening traversing the block of material in a first direction, and the sensing opening traversing the block of material in a second direction and intersecting the transit opening, the second direction different from the first direction, a light emitter positioned at a first end of the sensing opening and oriented to project light through the sensing opening and across the transit opening, and a plurality of light detectors positioned at a second end of the sensing opening and oriented to receive the projected light and to output detector signals based on an amount of detected light; in response to a determination that an amount of light detected by a light detector is less than a threshold, detect an insect; and wherein the sensor signals are received from the plurality of light detectors.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of systems and methods for insect detection. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

As a part of a wild insect population reduction program, it may be important to determine the extent of a wild population of an insect species (or multiple species) of interest. To do so, insects may be trapped, categorized, and counted. Counts from one or more traps may then be extrapolated to determine a wild insect population estimate for a geographic region. However, trapping, recognizing, and counting insects from traps is a labor-intensive process involving placing traps, recovering them later, and manually identifying and counting the captured insects. In addition, traps may be placed in locations that are extremely difficult to reach, even on foot. Thus, it can be difficult, timeconsuming, and expensive to obtain an accurate insect population estimate for a geographic region.

To alleviate these problems, automated insect detection, counting, and recognition techniques as described herein may be employed. In an illustrative example, an insect trap may be deposited at a location and configured with an inlet opening, an insect detector, an imaging and recognition system, and a collection container. The insect trap also includes a low-power computing device that can be used to detect insects and use the information from the imaging and recognition system to identify detected insects. The inlet opening is a small tube, approximately 2 inches in diameter and a few inches long. The inlet opening is arranged to allow insects to enter the tube, fly down the tube and through the insect detector and the imaging and recognition system, and into the collection container.

In this example, the insect detector is constructed of a block of material, such as a block of plastic. An insect transit hole is formed in the material to substantially match the size and shape of the inlet opening's tube. In addition, a slit is formed in the block of material along a plane that traverses the insect transit hole and runs the entire width (or height or length) of the block, thereby providing an unobstructed pathway for light to be shined through the block of material, and across the transit opening. In this example, the slit has a triangular cross section with a first point of the triangle defined at one side of the block, with the opposite side of the triangle at the opposite side of the block. A light-emitting diode ("LED") is positioned to project light into the slit at the first point. A row of light detectors is positioned at the opposite side of the block to receive the emitted light traversing the slit.

The LED emits a cone of light, only a small portion of which is able to travel through the slit, which substantially structures the emitted light by rejecting light rays that are not oriented to traverse the slit. The structured light thus traverses the slit, crosses the insect transit opening, re-enters the slit, and strikes one or more of the light detectors. In the event an insect travels through the insect transit opening, it may block some of the light, creating a shadow on one or more light detectors, which can be used to detect the insect. Thus, the insect detector is able to create a structured light curtain using a single LED, a block of material, and an array of light detectors without the need for special lenses or other optical components.

The light detectors are connected to a computing device, which receives the light detector outputs and is able to detect the presence of an insect when one or more light detectors indicates a reduction in received light, such as caused by an insect travelling through the insect transit opening and blocking some of the structured light. The computing device can then increment a counter of a number of detected insects. It can also activate the imaging and recognition system to try to determine the type of insect entering the trap. The imaging and recognition system can capture one or more images of the detected insect and provide them to the computing device, which can use one or more image recognition techniques to recognize the insect based on the images. After recognizing the insect, or after failing to do so for a period of time, the computing device can deactivate the insect imaging and recognition system to reduce power consumption.

Because this illustrative trap is intended to be placed at remote locations to help determine wild insect populations, it is battery powered. Thus, power efficiency is an important consideration. Because this example insect trap is able to detect insects using a single LED rather than an array of lights or other more complex sensors, the insect detector itself is very low power, such as on the order of 30-60 milliwatts ("mW") for the LED and even less power for the light detectors. The computing device may be a simple processing device that consumes only a few watts of power, particularly in cases where insect recognition is not used. But even in scenarios where insect imaging and recognition are employed, by gating-on such functionality only when an insect is detected, and then only for a few seconds, significant power savings can be realized.

Further techniques can be used to further reduce power consumption. For example, based on an estimated expected insect flight speed, the computing device may periodically pulse the LED on and off. For example, if an expected flight speed of a mosquito, e.g., 1.5 meters per second, having an average size of approximately 5 millimeters ("mm") would cause the mosquito to traverse the structured light (having a height of approximately 1 mm) in 4 milliseconds ("ms"). Thus, the computing device could toggle the LED at a frequency of substantially 250 hertz ("Hz"), and still expect to detect virtually every mosquito traversing the insect detector; however, in some examples, a sampling rate of five to ten times this minimum sampling rate may be employed to obtain more reliable sensor data. Further, while the LED is toggled off, the computing device could suspend insect detection operations, further reducing power consumption.

This illustrative example is given to introduce the reader to the general subject matter discussed herein and the disclosure is not limited to this example. The following sections describe various additional non-limiting examples and examples of systems and methods for insect detection.

Figure 1:
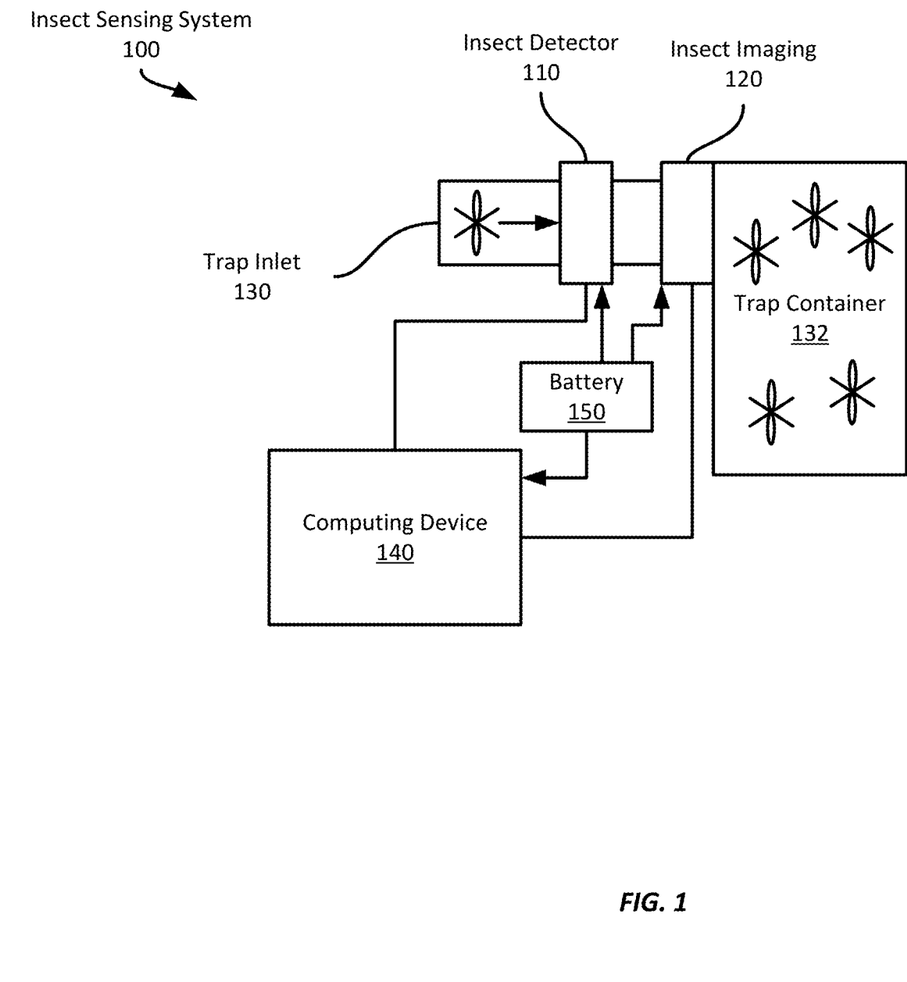
FIG. 1 shows an example system for insect detection according to one example.

Referring now to FIG. 1, FIG. 1 shows an example insect sensing system 100. The system 100 in this example includes a trap inlet 130 which provides a passageway to an insect detector 110, and continues to an insect imaging sensor 120 before opening up into a trap container 132. A computing device 140 is connected to the insect detector 110 and to the insect imaging sensor 120 to send and receive signals with respect to each. This example system 100 is powered by a battery 150, which provides power to the computing device 140, the insect detector 110, and the insect imaging sensor 120. In some examples, the computing device 140 may also control a door or flap on the trap container to allow a detected insect to enter the trap, but to then close the door or flap to contain the insect within the container 132. And while this example system 100 includes both an insect detector 110 and the insect imaging sensor 120, it should be appreciated that the insect imaging sensor 120 is optional in some examples. Examples of insect detectors will be discussed in more detail with respect to FIGS. 2A-2C, 3, 4, 5A-5B, and 6.

In this example, the image sensor is a digital camera that is positioned and oriented to capture images of an interior portion of the trap inlet to capture one or more images of an insect within the trap inlet. In one example, the trap inlet may be constructed of a transparent material to enable the camera to capture images of the interior of the trap inlet 130; however, in some examples, a hole may be bored or formed in the trap inlet 130 to allow a lens of the camera to be inserted into the trap inlet 130.

In some examples multiple image sensors may be employed. For example, a first camera may be oriented along one axis, e.g., a vertical axis, and a second camera may be oriented along a second axis, e.g., a horizontal axis, so that each camera is capturing images of substantially the same volume within the inlet tube 130. Such an arrangement may allow for images of a single insect from different perspectives, which may help enhance a reliability of inset recognition. For example, images from each camera may be input into different trained machine learning techniques, which may then each output a recognized insect. The outputs may then be compared and, if they match, the insect is determined to be recognized; otherwise, the insect may be determined not to be recognized. Further, if more than two cameras are employed, all outputs may be required to be the same to recognize the insect, though in some examples, only a threshold number of outputs need to match, e.g., a majority. Still further examples may be employed, e.g., with multiple cameras in series to capture images at different positions or orientations along the length of the trap inlet, etc.

Figure 2A:
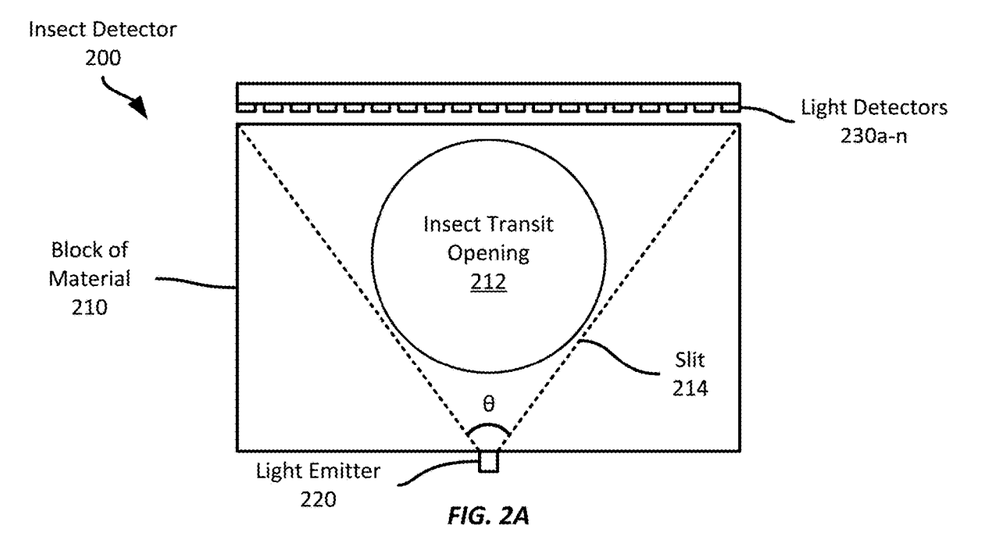
FIGS. 2A-2C, 3, 4, 5A-5B, and 6-10 show example insect detectors.
Figure 2B:
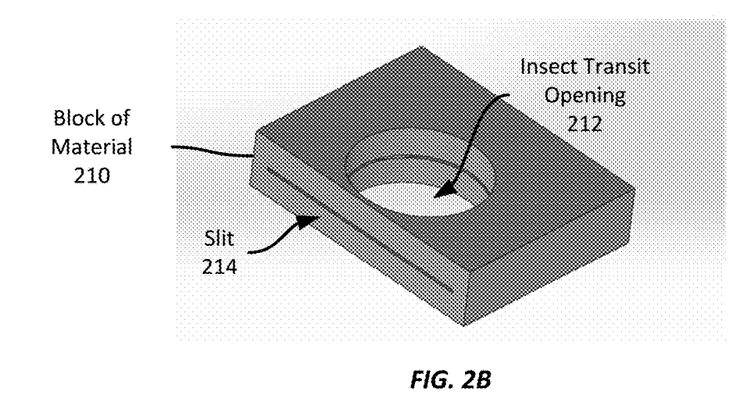
Figure 2C:
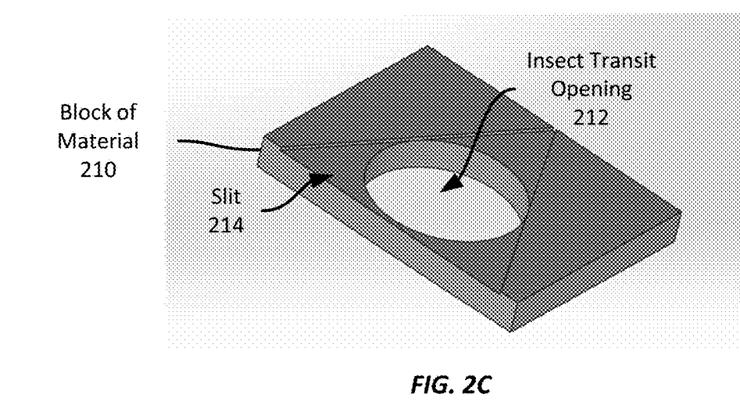

Referring now to FIGS. 2A-2C, FIGS. 2A-2C show an example insect detector. FIG. 2A shows a cross-section of the insect detector 200, which includes a block of material 210 that defines an insect transit opening 212 and a sensing opening, referred to as slit 214. In this example, the block of material 200 is a plastic material, such as polystyrene, however any suitable material may be employed, such as wood, metal, etc. A light emitter 220 is positioned at one side of the block of material 210 and oriented to project light through the slit 214, across the insect transit opening 212, and onto the light detectors 230a-n.

The block of material 210 in this example is approximately 5 centimeters ("cm") across (between the light emitter and the array of detectors) and the insect transit opening 212 has a diameter of approximately 3.8 cm. However, any suitable dimensions may be employed. It should be appreciated that increasing the length of the slit between the light emitter 220 and the light detectors 230a-n may provide improved light structuring, but may also reduce the amount of light arriving at the light detectors 230a-n. Thus, as the distance between the light emitter 220 and the light detectors 230a-n increases, more powerful light emitters may be employed.

The slit 214 in this example has a triangular cross-section, while the insect transit opening 212 has a circular cross section. The insect transit opening 212 and the slit 214 are oriented so that the slit 214 lies in a plane that is transverse to the cross-section of the insect transit opening 212. This detail can be seen in FIG. 2B, which shows a perspective view of the block of material 210 and defined openings 212, 214, and in FIG. 2C, which shows a cut-away version of the perspective shown in FIG. 2B. Further, the slit 214 is defined such that it substantially intersects with the entire cross-sectional area of the insect transit opening 212. Thus, an insect traversing the insect transit opening 212 should cross through slit 214 as well.

While the examples above contemplate a slit 214 that substantially overlaps the entire insect transit opening 212, it should be appreciated that complete overlap is not required in some examples, so long as any non-overlapping regions are too small to allow an insect to entirely avoid crossing the slit 214 while traversing the insect transit opening 212. Further, in some examples, if an insect detector is configured to detect flying insects rather than crawling insects, the slit 214 may be configured to not project light across one or more edges of the insect transit opening 212, or, conversely, if the insect detector is configured to detect crawling insects, the slit 214 may be configured to not project light across a middle portion of the insect transit opening.

Figure 7:
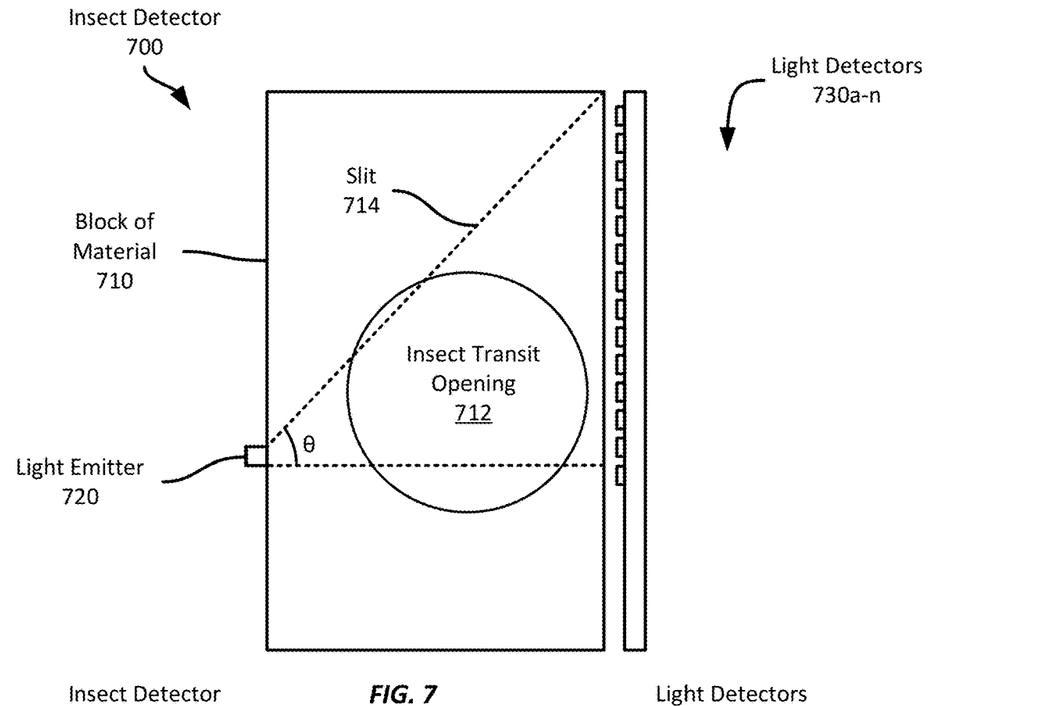
Figure 8:
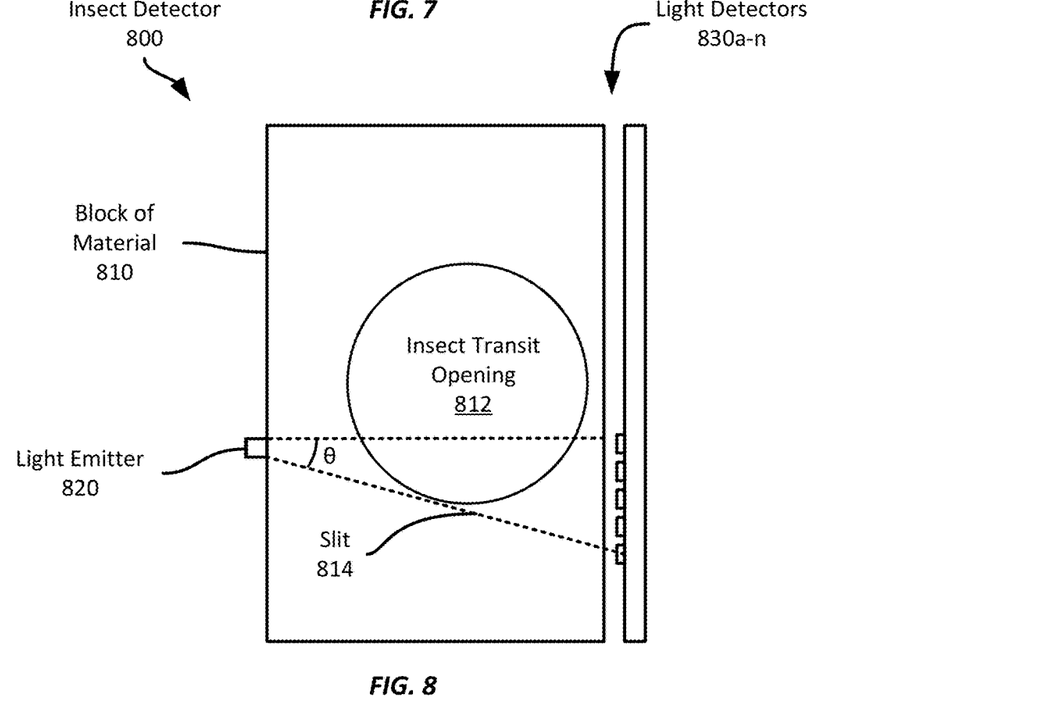
Figure 9:
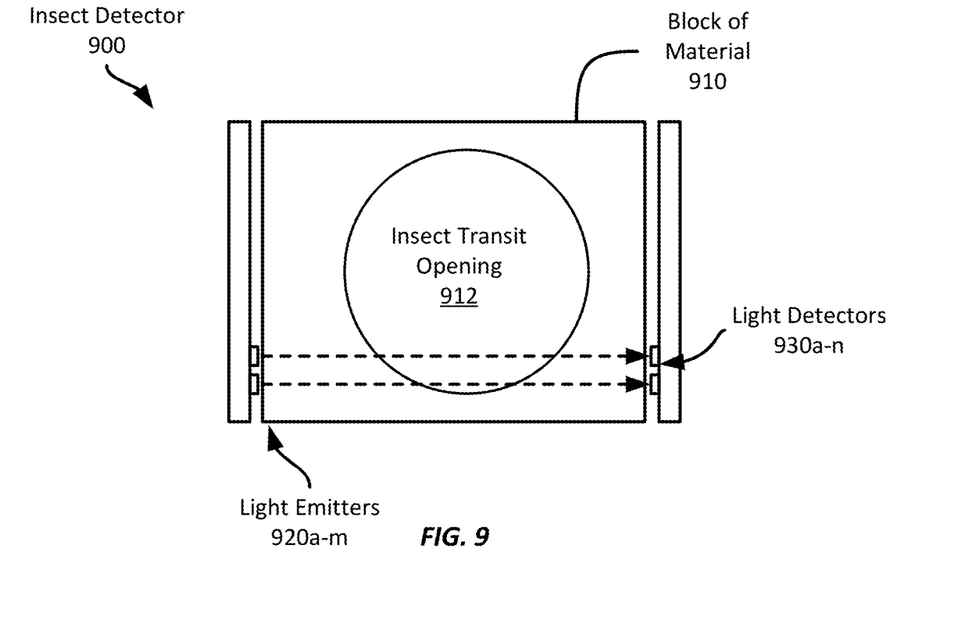
Figure 10:
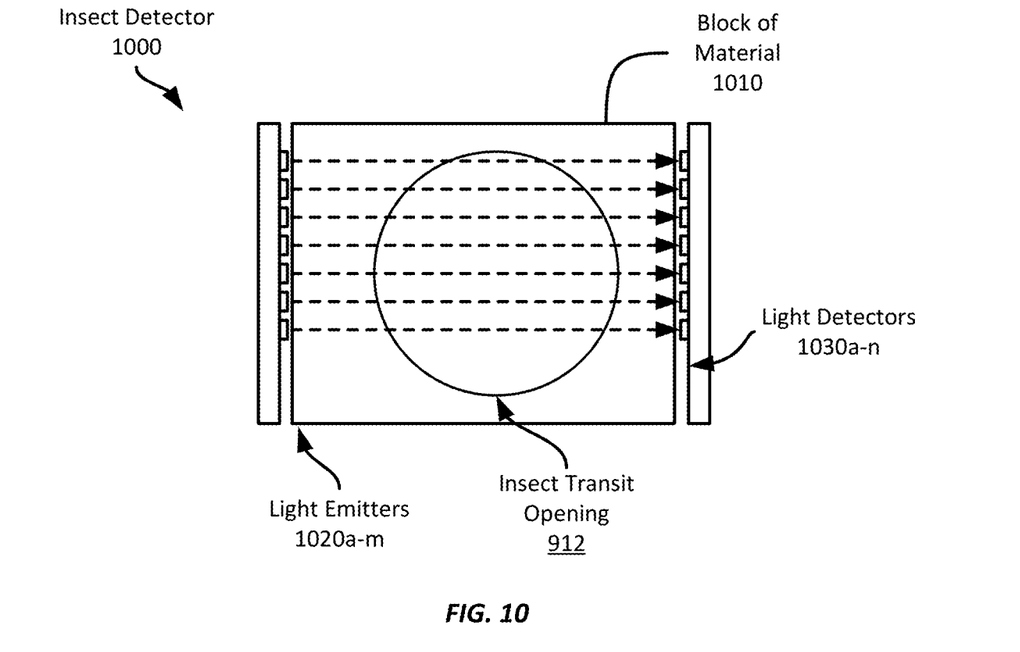

FIGS. 7 and 9 show example slit 714, 914 configurations configured to not detect some crawling insects, while FIGS. 8 and 10 show example slit 814, 1014 configurations configured to not detect some flying insects. It should be appreciated that other configurations of slits, emitters, detectors, or insect transit openings, or combinations of these may be employed to help avoid detecting insects that are not of interest. Further, it should be appreciated that the configurations shown in FIGS. 7 and 8 may be combined, such as shown in FIG. 2A; however, one or more light detectors 230a-n may provide signals to be interpreted as indicating flying insects (e.g., corresponding to light detectors 730a-n), and other light detectors 230a-n may provide signals to be interpreted as indicating walking insects (e.g., corresponding to light detectors 830a-n). Thus, combining the sets of light detectors 730a-n and 830a-n may provide differentiated detection of walking and flying insects in the same system. Similarly, the examples shown in FIGS. 9 and 10 may likewise be combined to provide differentiated detection of walking and flying insects.

The height of the slit 214, which is in the direction extending orthogonal to the plane of the drawing, is approximately 0.8 mm; however, any suitable height may be employed. A height of substantially 0.5-1.5 mm may enable the slit to provide structured light to the light detectors 230a-n by rejecting light that is not oriented towards a light detector 230a-n. The height of the slit 214 may impact the arrangement of the light detectors 230a-n and, as the height decreases, reduce the amount of light received by the light detectors 230a-n. Further, the height of the slit may be selected based on the size and sensitivity of the light detectors 230a-n. For example, the more sensitive the light detectors 230a-n that are used, the smaller the height of the slit 214.

In this example, the longitudinal axis of the insect transit opening 212 is orthogonal to the plane in which the slit 214 is defined; however, an orthogonal relationship is not required. Rather, the slit 214 may be transverse to the cross-section of the insect transit opening at any suitable angle that is not parallel to the longitudinal axis of the insect transit opening 212.

A light emitter 220 is positioned adjacent to the slit 214 in this example and is oriented to emit light into the slit 214. A linear array of light detectors 230a-n is positioned adjacent to the slit 214 at the side of the triangle opposite the light emitter 220 such that light emitted by the light emitter 220 travels through the slit and onto the light detectors 230a-n.

In this example, the light emitter 220 is an LED and emits light generally in a cone shape. The maximum departure angle of light rays from the LED generally corresponds to the internal angle, θ, at the triangle point adjacent to the light emitter. Thus, the emitted light substantially fills the entirety of the slit when the LED is active; however, the power emitted light across the entire angle, θ, may not be uniform for the LED. For example, the power of the emitted light may decrease as the angle increases. Thus, depending on an application, an angle may be selected based on power versus emission angle information and a minimum power value may be selected as a cutoff point to select an angle. However, it should be appreciated that any suitable angle may be employed to define the slit so long as emitted light of sufficient crosses substantially the entire cross-section of the insect transit opening, where any gaps in coverage should be less than the size of an insect expected to traverse the insect transit opening, or should be positioned to not detect crawling or flying insects as discussed above. Further, the selected internal angle, θ, may depend on the type of light emitter 220 selected for a particular example as different light emitters 220 may provide light cones having different sizes and shapes.

After traversing the slit 214, the structured light arrives at the array of light detectors 230a-n. It should be appreciated the signal-to-noise ratio ("SNR") of the emitted light arriving at the light detectors 230a-n should be sufficiently high to ensure accurate insect detection, and may be impacted by the height of the slit or the presence of one or more ambient light sources. In particularly noisy environments, such as when the system 200 is in a well-lit environment, the SNR may decrease; however, use of higher-quality light detectors may be employed to obtain better SNR. Alternatively, the computing device may be trained, e.g., using a machine learning technique or simply by experimentation to establish base-line values, to establish a steady-state detector signal and threshold reductions from the steady state that indicate the presence of an insect. For example, a machine learning technique could be trained on a set of live insects or insect-sized objects dropped through the insect transit opening at varying distances from the light emitter to train the machine learning technique on reductions in detected light when insects traverse the opening.

Figure 3:
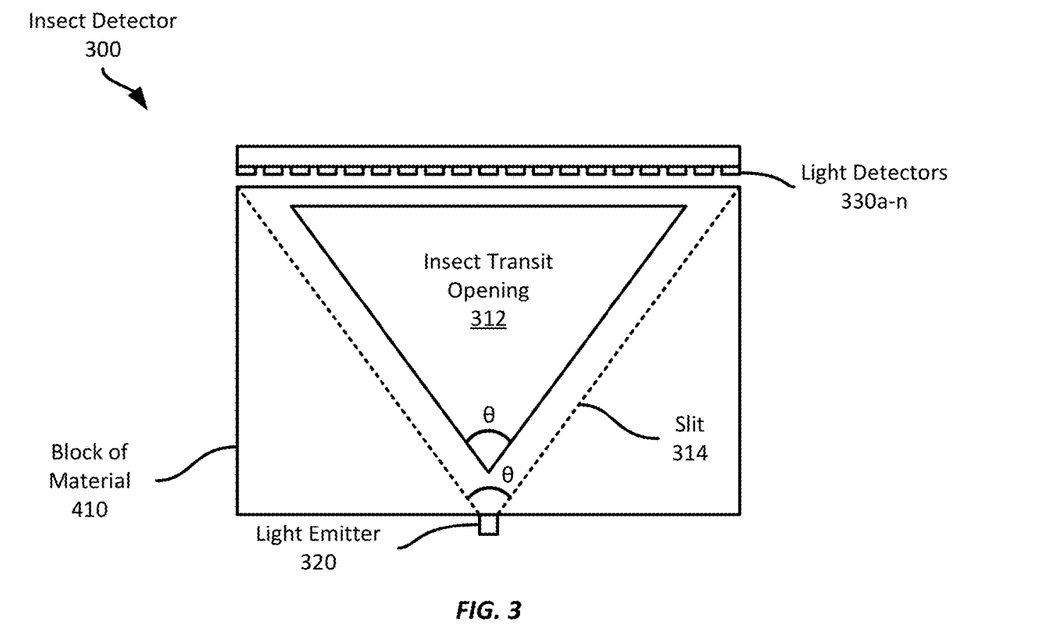

While the insect transit opening 212 in this example is circular, any suitable cross-section may be employed, including rectangular, triangular, etc. For example, FIG. 3 shows an example insect detector 300 similar to the example shown in FIGS. 2A-2C but that employs an insect transit opening 312 having a triangular cross section that substantially corresponds with the shape of the slit's triangular cross-section. In this example, the slit's 214 internal angle, θ, is substantially the same as the corresponding internal angle, θ, of the insect transit opening's cross-section, though such a configuration is not required.

Figure 4:
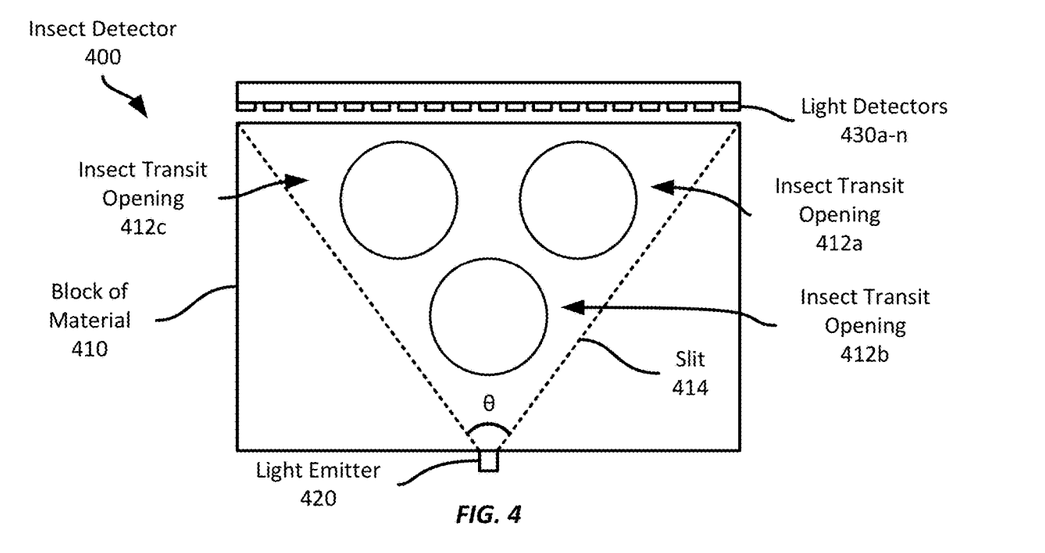

In some examples, rather than employing a single insect transit opening, multiple insect transit openings may be defined in a single block of material, all of which may be traversed by a single slit. Referring to FIG. 4, FIG. 4 shows an example insect detector 400 that has multiple insect transit openings 412a-c defined in the block of material 410. Each of the insect transit openings 412a-c is defined such that the slit 414 is transverse to substantially the entire cross-section of each of the insect transit openings 412a-c.

The light detectors 230a-n in this example are phototransistors, but may be any suitable light detector, such as photodiodes, photoresistors, charge-coupled devices, CMOS sensors, etc. Further, while the light detectors 230a-n are depicted as a linear array, i.e., a 1×N array, such an arrangement is not required, and M×N arrays may be employed in some examples; however, it should be appreciated that the dimensions of such an array may be limited by the height of the slit 214 employed in a particular example. Further, increasing the dimensionality of the light detector array may increase power usage, create greater opportunity for cross-correlated signals, and increase the amount of time an insect spends within the emitted light. Finally, with respect to the depicted light detectors 230a-n, the label 'a-n' is intended to represent an arbitrary number of light detectors. Specifically, 'n' refers to the length of a 1×N array of light detectors and may be any positive integer.

Figures 5A, 5B, 6:
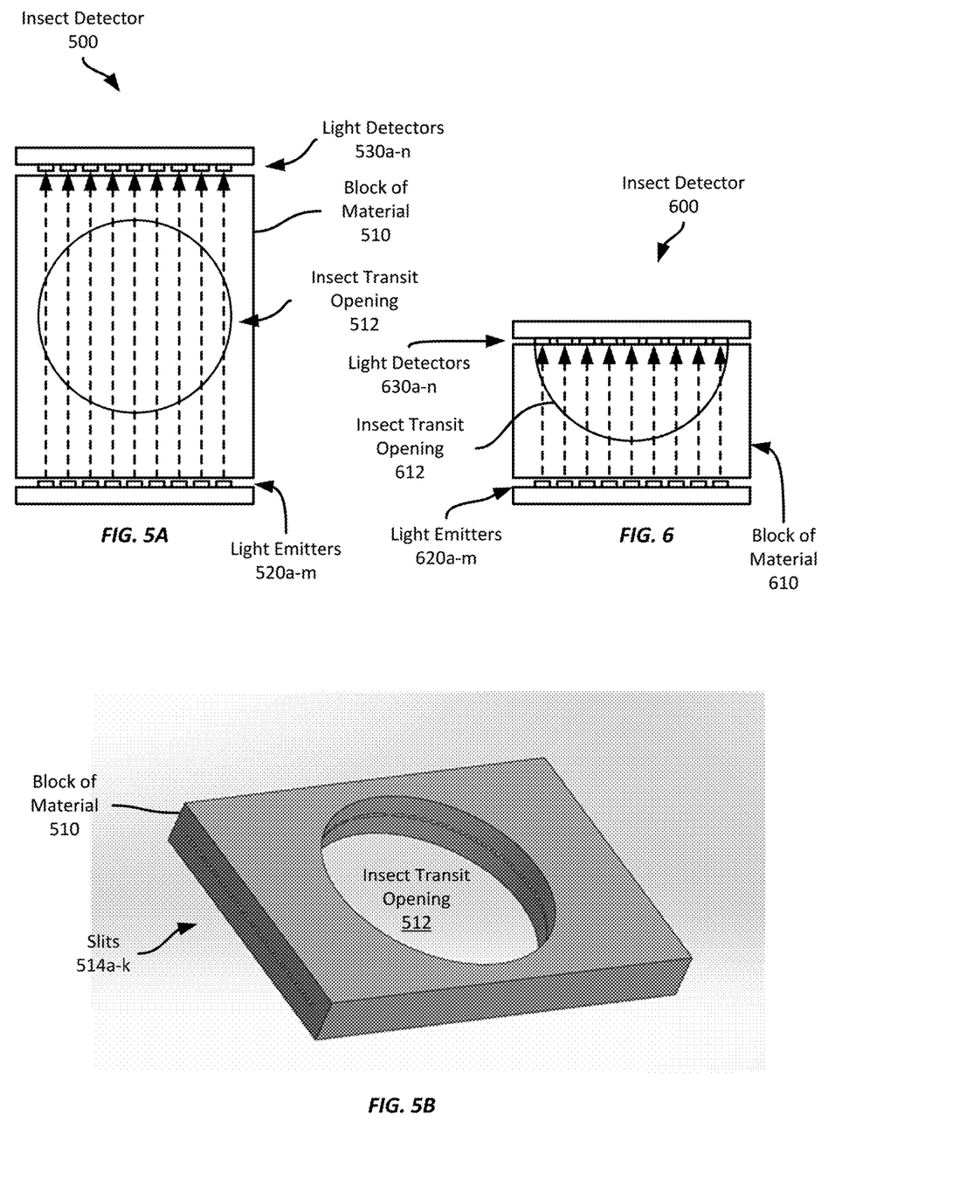

Referring now to FIGS. 5A-5B, FIGS. 5A-5B shows an example light detector. Similar to the example shown in FIGS. 2A-2C, the block of material 510 defines an insect transit opening 512. However, unlike the example shown in FIGS. 2A-2C, a plurality of slits 514a-k are defined within the block of material 510, with each slit defined as a tube having a substantially circular cross-section. Each slit 514a-n is defined to traverse the insect transit opening 512 between a set of light emitters 520a-m and a set of light detectors 530a-n. As discussed above, the ranges 'a-m' and 'a-n' are intended to represent an arbitrary number of light emitters and light detectors. Further, the number of light emitters may be the same as the number of light detectors, i.e., m=n in some examples, however, such a configuration is not required.

In the configuration shown in FIG. 5A, each light emitter 520a-m emits light towards the block of material and the respective slits 514a-k, which structures the light by rejecting light that is not properly oriented towards the opposite end of the respective slit 514a-k (and shown in FIG. 5B). The structured light traverses the respective slit 514a-k and arrives at a detector 530a-n oriented to receive structured from one or more slits 514a-k. The structured light arriving at the detectors 530a-n is likely to result in low cross-correlation of signals between nearby detectors, and thus a high SNR. However, as discussed above, low SNR due to environmental light or slit configuration may be accommodated by higher quality light detectors, by employing a trained machine learning technique, or experimentally established thresholds.

Referring to FIG. 5B, a perspective view of the block of material 510 is shown having the plurality of slits 514a-k referenced above. In this example, the slits 514a-k are formed as tubes having substantially circular longitudinal cross-sections having a diameter of substantially 0.8 mm. It should be appreciated, however, that any suitable diameter or cross-sectional shape may be employed. In addition, the spacing between slits 514a-k (or "pitch") in the example shown in FIG. 5B is approximately 1-1.5 mm; however, such a pitch is not required. Rather, a pitch may be established based on the expected size of insect traversing the insect transit opening 512. For example if *Aedes aegypti* mosquitos are the insect population of interest, inter-slit spacing may be established at approximately 2 mm. Such a spacing may reduce the number of slits, the number of light emitters 520a-m, the number of light detectors 530a-n, or a combination of these needed to transmit light across the insect transit opening 512 to detect insects. If smaller insects that are not of interest are able to pass through the insect transit opening 512 without detection, in some such examples, it may not have any impact on any counting or recognition. Further, it may provide a benefit of power reduction by not activating an imaging and recognition system, e.g., insect imaging sensor 120, for such insects.

While the examples shown in FIGS. 5A-5B employ a circular insect transit opening 512, as discussed above with respect to FIGS. 2A-2C, 3, and 4, any suitable shape or shapes may be employed. For example, referring to FIG. 6, FIG. 6 shows an example insect detector 600 employing a block of material 610 defining an insect transit opening 612 in the shape of a half-circle with an open upper end. In this example, rather than an additional portion of the block of material 610 enclosing the insect transit opening 610, the light detectors 630a-n themselves provide an upper boundary to the insect transit opening 612; however, in some examples, the insect transit opening 612 may be entirely defined by the block of material 610.

Figure 11:
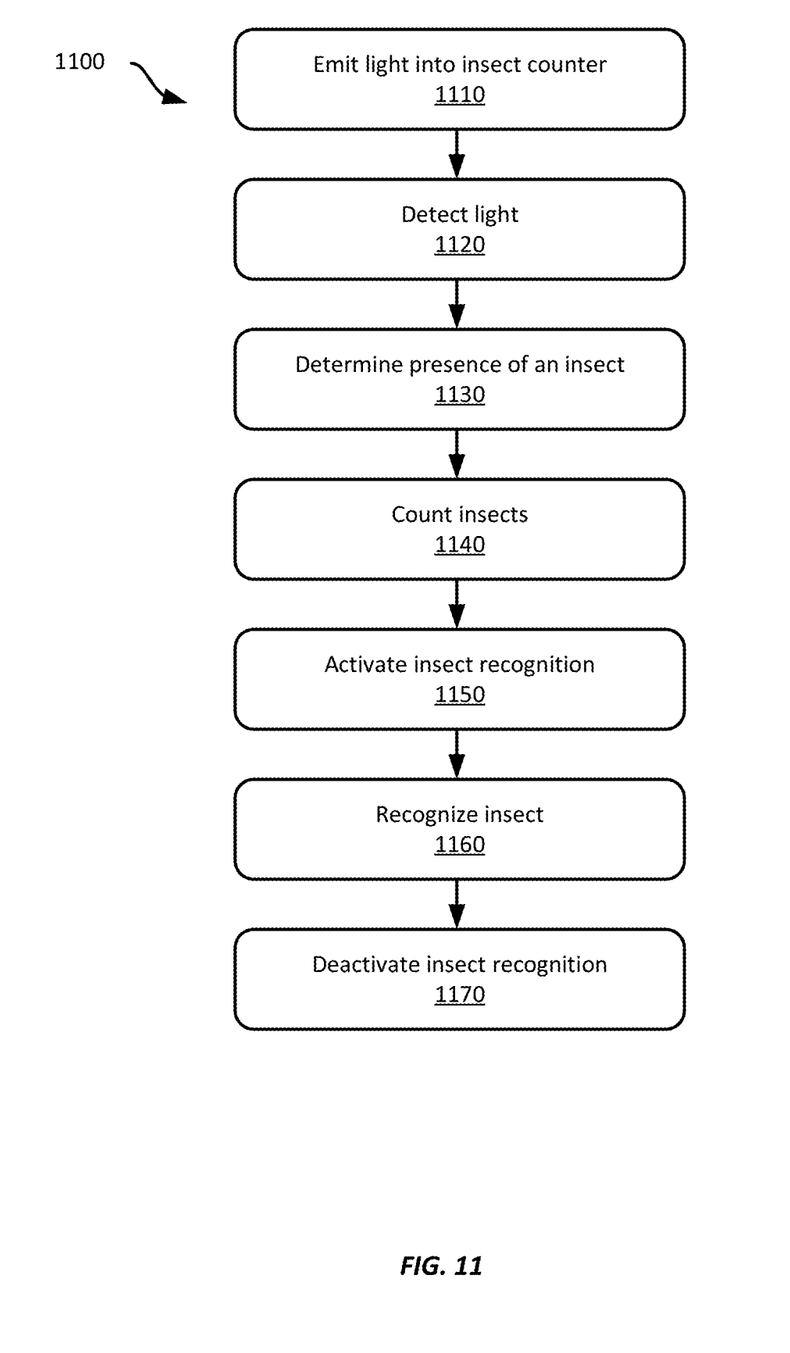
FIG. 11 shows an example method for insect detection.

Referring now to FIG. 11, FIG. 11 shows an example method 1100 for insect detection. This example method 1100 will be discussed with respect to the system 100 shown in FIG. 1 and the computing device 800 shown in FIG. 8 and described in detail below; however, any suitable system according to this disclosure may be employed.

At block 1110, the light emitter 220 emits light into the sensing opening (or slit) 214 defined in the block of material 210. In this example, the light emitter 220 is an LED and is positioned at one side of the block of material and oriented to emit light into a first portion of the slit 214; however, any suitable type or number of emitters may be employed (e.g., see FIGS. 5A-5B).

At block 1120, each light detector 230a-n detects an amount of light received by the respective light detector. In this example, the light detectors 230a-n are phototransistors and are configured to output a signal based on the amount of light detected by the respective phototransistor. As discussed above, however, any suitable type of light detector, or mix of types of light detectors, may be employed.

At block 1130, the computing device 140 receives signals from one or more of the light detectors 230a-n and determines whether an insect is present based on an amount of light detected by at least one of the light detectors 230a-n.

In this example, the computing device 140 has been configured with a threshold value, and it compares an amount of light detected by the light detectors against the threshold. If at least one light detector indicates an amount of light below the threshold value, the computing device determines an insect is present. In some examples, if multiple light detectors output signals indicating a respective detected amount of light below the threshold, the computing device 140 may determine that an insect has been detected; however, if a number of adjacent light detectors indicating such a low light level exceed another threshold, e.g. six light detectors report low light levels, the computing device 140 may determine two insects have been detected, or it may indicate that a non-insect object has entered the insect transit opening 212 and determine that no insect has been detected. Further, in some examples, a trained machine learning model may be employed to detect the presence of insects based on reduced amounts of sensed light.

At block 1140, the computing device 140 increments a counter in response to determining that an insect is present at block 1130.

At block 1150, the computing device 140 activates an insect imaging and recognition system. In this example, the insect imaging and recognition system includes a camera 120 and a trained machine learning technique executed by the computing device 140. To activate the insect imaging and recognition system in this example, the computing device 140 transmits a signal to the camera to power on the camera, or to wake the camera out of a suspend or sleep state. In some examples, the computing device 140 may transmit a signal that electrically connects the battery 150 to the camera, such as by activating an electronic switch, e.g., a transistor. The computing device 140 may also execute software instructions to begin receiving images from the camera. For example, the camera may stream video images to a video input in the computing device. In such an example, the computing device 140 may execute software to receive images via the video input.

In some examples, the computing device 140 may employ a separate, dedicated recognition processor 860 for insect recognition. Thus, the computing device 140 may activate the recognition processor 860 in conjunction with activating the camera, such as by enabling a clock signal for the recognition processor 860, by coupling the battery 150 to the recognition processor 860 to provide electrical power, etc.

At block 1160, the computing device 140 uses the trained machine learning technique to recognize the detected insect. In this example, one or more images from the camera are provided as inputs to the trained machine learning technique. The trained machine learning technique then attempts to recognize any insect present in the inputted image(s). If an insect is recognized, the computing device 140 may generate a record associated with the recognized insect and may store the image(s) and associate them with the corresponding record. If an insect is not recognized, the computing device may generate a record indicating an unrecognized insect and may store the captured image(s) and associate them with the record.

In some examples, the computing device 140 may also increment a specific counter associated with the type of recognized insect. For example, if *Aedes aegypti* are of interest, a discrete counter for recognized *Aedes aegypti* may be incremented when such an insect is detected. The discrete counter may be maintained separately from the counter discussed with respect to block 1140. Alternatively, the counter at block 1140 may only be incremented when an insect of interest is recognized. In one such example, block 1140 is performed after block 1160.

At block 1170, the computing device 140 disables the insect imaging sensor 120. In this example, the computing device 140 disables the insect imaging sensor 120 after successfully recognizing the detected insect or after a threshold period of time without successfully recognizing the detected insect. In some examples, the computing device 140 may disable the insect imaging sensor 120 after receiving an image of the insect, irrespective of any indication of recognition of the insect, or potentially even before recognition is attempted. Such a technique may reduce power consumption by limiting the amount of time the insect imaging sensor 120 is active. In other examples, the computing device 140 may only deactivate the insect imaging sensor 120 after the insect is no longer detected within images received from the sensor 120.

It should be appreciated that while the blocks shown in FIG. 11 are provided in a particular order, no such ordering should be inferred. For example, as discussed above, block 1140 may occur after block 1160 in some examples. Still further variations are within the scope of this disclosure.

Figure 12:
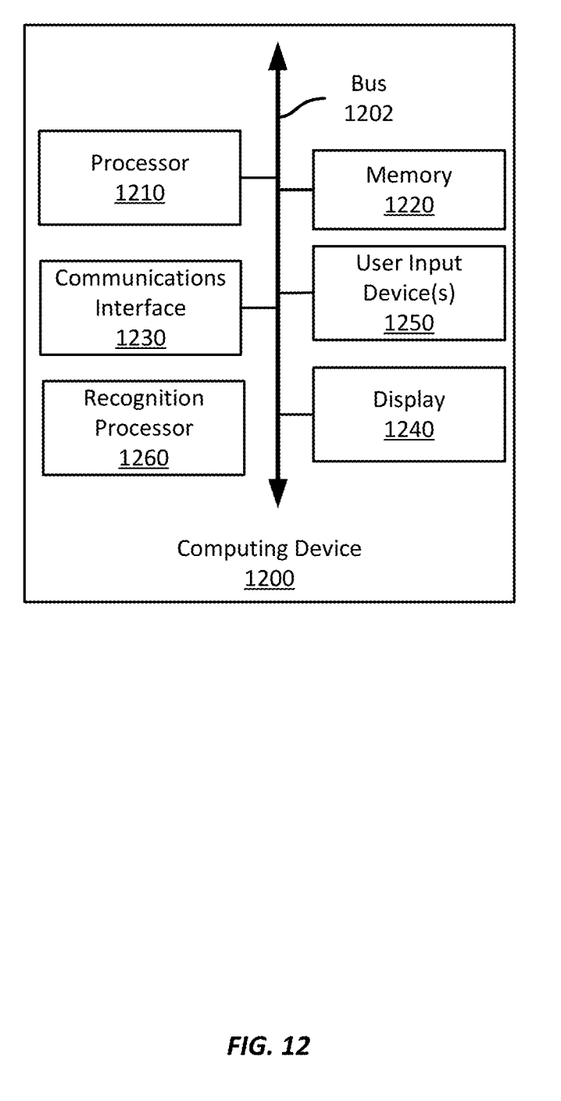
FIG. 12 shows an example computing device suitable for example systems and methods for insect detection.

Referring now to FIG. 12, FIG. 12 shows an example computing device 1200 suitable for use in example systems or methods for insect detection according to this disclosure. The example computing device 1200 includes a processor 1210 which is in communication with the memory 1220 and other components of the computing device 1200 using one or more communications buses 1202. The processor 1210 is configured to execute processor-executable instructions stored in the memory 1220 to perform one or more methods for insect detection according to different examples, such as part or all of the example method 1100 described above with respect to FIG. 11. The computing device, in this example, also includes one or more user input devices 1250, such as a keyboard, mouse, touchscreen, microphone, etc., to accept user input. The computing device 1200 also includes a display 1240 to provide visual output to a user.

In addition to processor 1210, the computing device 1200 may also include a separate dedicated recognition processor 1260. The dedicated recognition processor 1260 may be a general purpose processor configured to execute a trained machine-learning technique stored in memory 1220; however, in some examples, the dedicated recognition processor 1260 may be an application-specific integrated circuit ("ASIC"), a neural network processor, or other artificial intelligence processor.

The computing device 1200 also includes a communications interface 1240. In some examples, the communications interface 1230 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A device comprising:
    a block of material defining a transit opening and a sensing opening,
        the transit opening defined along a first axis in a first direction, and
        the sensing opening defined to provide a light path to traverse a cross-section of the transit opening;
    a light emitter positioned at a first end of the sensing opening and oriented to project light through the sensing opening and across the transit opening; and
    a plurality of light detectors positioned at a second end of the sensing opening and oriented to receive the projected light and to output detector signals based on an amount of detected light.

2. The device of claim 1, wherein the sensing opening is slit having a height based on a size of the light detectors and a sensitivity of the light detectors.

3. The device of claim 2, wherein the sensing opening has a first length adjacent to the light emitter and a second length adjacent to the plurality of light detectors, the second length greater than the first length.

4. The device of claim 3, wherein the light emitter is a light-emitting diode ("LED"), and the second length is selected based on a cone angle of the LED.

5. The device of claim 1, wherein block of material defines a plurality of sensing openings, each sensing opening substantially parallel to the other sensing openings; and wherein each light detector of the plurality of light detectors is positioned at a second end of a respective sensing opening; and further comprising a plurality of light emitters, each light emitter positioned at first end of a respective sensing opening.

6. The device of claim 1, further comprising a computing device in communication with the plurality of light detectors, the computing device comprising a non-transitory computer-readable medium and a processor configured to execute processor executable instructions stored in the non-transitory computer-readable medium to:
    receive sensor signals from the plurality of light detectors, the sensor signals indicating an amount of light detected by a respective light detector; and
    in response to a determination that the amount of light detected by a light detector is less than a threshold, detect an insect.

7. The device of claim 6, wherein the processor is further configured to execute processor executable instructions stored in the non-transitory computer-readable medium to count a number of insects over a duration.

8. The device of claim 6, wherein the computing device is in communication with the light emitter, and the processor is further configured to execute processor executable instructions stored in the non-transitory computer-readable medium to activate and deactivate the light emitter.

9. The device of claim 8, wherein the processor is further configured to execute processor executable instructions stored in the non-transitory computer-readable medium to pulse the light emitter at a rate based on an expected insect movement speed.

10. The device of claim 6, further comprising a battery, and wherein the computing device and the light emitter are configured to be powered by the battery.

11. The device of claim 6, further comprising an image sensor, and wherein the processor is configured to execute processor executable instructions stored in the non-transitory computer-readable medium to activate the image sensor in response to detection of an insect.

12. The device of claim 1, further comprising a collection container, wherein the collection container is positioned at a first side of the transit opening and to receive and store insects passing through the transit opening.

13. A method comprising:
 emitting light using a light emitter into a block of material defining a transit opening and a sensing opening, the transit opening traversing the block of material in a first direction, and the sensing opening traversing the block of material in a second direction and intersecting the transit opening, the second direction different from the first direction,
 detecting, using a plurality of light detectors, an amount of light detected by each light detector of the plurality of light detectors;
 determining a presence of an insect based on the amount of light detected by at least one light detector; and
 wherein:
  the light emitter positioned at a first end of the sensing opening and oriented to project light through the sensing opening and across the transit opening, and
  a plurality of light detectors positioned at a second end of the sensing opening and oriented to receive the projected light and to output detector signals based on an amount of detected light.

14. The method of claim 13, wherein the sensing opening is slit having a height based on a size of the light detectors and a sensitivity of the light detectors.

15. The method of claim 14, wherein the sensing opening has a first length adjacent to the light emitter and a second length adjacent to the plurality of light detectors, the second length greater than the first length.

16. The method of claim 15, wherein the light emitter is a light-emitting diode ("LED"), and the second length is selected based on a cone angle of the LED.

17. The method of claim 13, wherein block of material defines a plurality of sensing openings, each sensing opening substantially parallel to the other sensing openings; and wherein each light detector of the plurality of light detectors is positioned at a second end of a respective sensing opening; and further comprising a plurality of light emitters, each light emitter positioned at first end of a respective sensing opening.

18. The method of claim 13, further comprising:
 receiving, by a computing device, sensor signals from the plurality of light detectors, the sensor signals indicating an amount of light detected by a respective light detector; and
 in response to determining by the computing device that the amount of light detected by a light detector is less than a threshold, detecting, by the computing device, an insect.

19. The method of claim 18, further comprising counting a number of insects over a duration.

20. The method of claim 18, further comprising pulsing the light emitter at a rate based on an expected insect movement speed.

21. The method of claim 18, further comprising, in response to detecting an insect, activating an image sensor.

22. A non-transitory computer-readable medium comprising processor-executable instructions configured to cause a processor to:
 receive sensor signals from an insect counter, the insect counter comprising:
  a block of material defining a transit opening and a sensing opening,
   the transit opening traversing the block of material in a first direction, and
   the sensing opening traversing the block of material in a second direction and intersecting the transit opening, the second direction different from the first direction,
  a light emitter positioned at a first end of the sensing opening and oriented to project light through the sensing opening and across the transit opening, and
  a plurality of light detectors positioned at a second end of the sensing opening and oriented to receive the projected light and to output detector signals based on an amount of detected light;
 in response to a determination that an amount of light detected by a light detector is less than a threshold, detect an insect; and
 wherein the sensor signals are received from the plurality of light detectors.

23. The non-transitory computer-readable medium of claim 22, further comprising processor executable instructions configured to cause the processor to count a number of insects over a duration.

24. The non-transitory computer-readable medium of claim 22, further comprising processor executable instructions configured to cause the processor to activate and deactivate the light emitter.

25. The non-transitory computer-readable medium of claim 24, further comprising processor executable instructions configured to cause the processor to pulse the light emitter at a rate based on an expected insect movement speed.

26. The non-transitory computer-readable medium of claim 22, further comprising a collection container, wherein the collection container is positioned at a first side of the transit opening and to receive insects passing through the transit opening.

27. The non-transitory computer-readable medium of claim 22, further comprising processor executable instructions configured to cause the processor to, in response to detection of an insect, activating an image sensor.

* * * * *